T. J. Price.
Seed Sower.
N° 96,347. Patented Nov. 2, 1869.
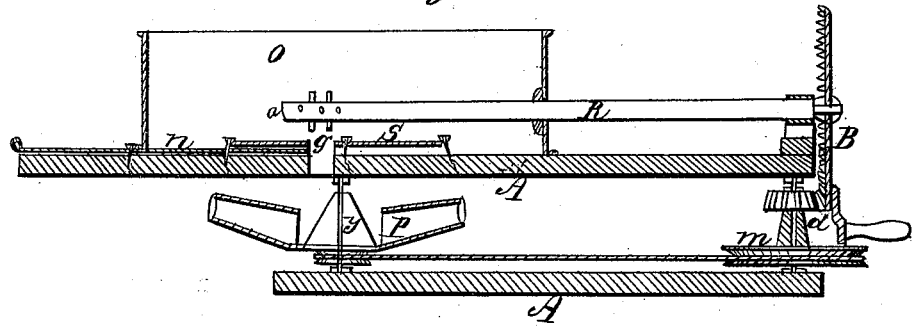
Fig. 1.
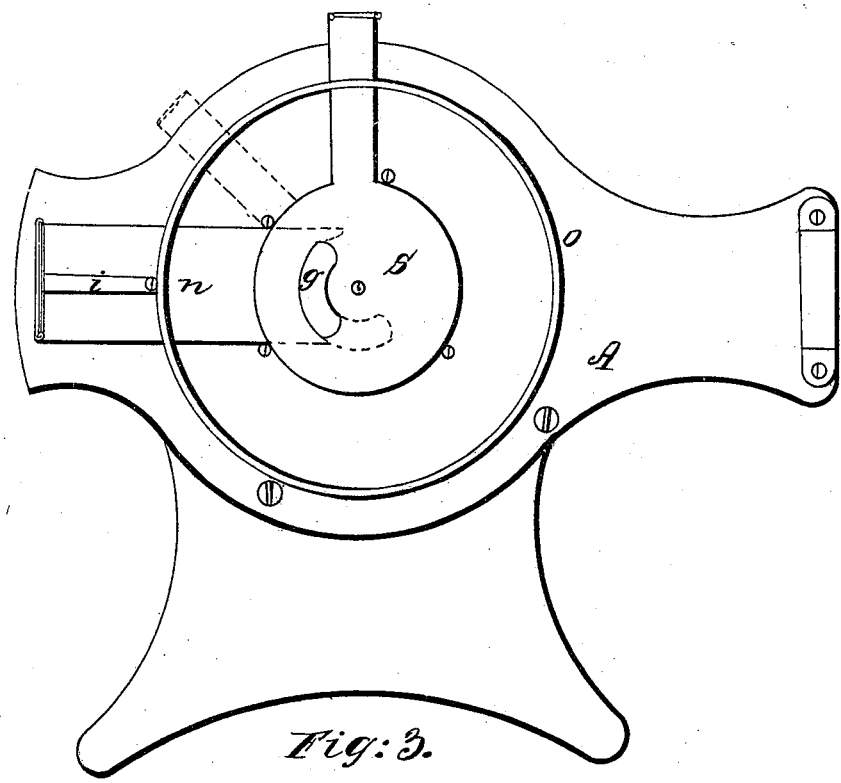
Fig. 2.
Fig. 3.
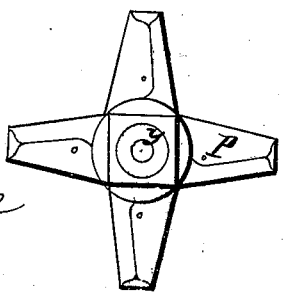
Witnesses
John M. Price
Arch'd Fisher
Inventor
Thos. J. Price

United States Patent Office.

THOMAS J. PRICE, OF MACOMB, ILLINOIS.

Letters Patent No. 96,347, dated November 2, 1869.

IMPROVEMENT IN SEED-SOWER.

The Schedule referred to in these Letters Patent and making part of the same.

*To all whom it may concern:*

Be it known that I, THOMAS J. PRICE, of Macomb, in the county of McDonough, and State of Illinois, have invented a new and useful Improvement in Broadcast Seed-Sowers; and I do hereby declare that the following is a full, clear, and exact description of the same, reference being had to the accompanying drawings, and to the letters of reference marked thereon, making a part of this specification, in which—

Figure 1 is a longitudinal section;

Figure 2 is a top view; and

Figure 3 is the distributer, detached.

My invention relates to seed-sowers; and

It consists mainly in the construction and novel arrangement of devices, by which seed of grain may be easily and effectively sown broadcast, and distributed evenly upon the ground, without regard to any ordinary breeze that may be blowing at the time.

To enable others skilled in the art to make and use my invention, I will proceed to describe its construction and operation, in which—

A A represent the upper and lower pieces of the frame.

On the upper piece is mounted a hopper, *o*.

The shaft R has a toothed wheel, B, attached at one end. The other end extends into the hopper *o*, and is provided with pegs *a*, for the purpose of stirring the seed, and to keep the hole *g* from getting clogged up.

The wheel B gears into a pinion, which is attached to the shaft *d*, at the lower end of which is attached the pulley *m*, from which, by means of a belt, the distributor P receives its motion.

The distributer is attached to a cone-shaped shaft, *y*, and is provided with four tubes or egresses, for the seed to escape through, and which is thrown out by centrifugal force.

The outward points of the tubes are slightly elevated, which causes the seed to be thrown to a greater distance than it would otherwise.

The valve *s* is attached, inside of the hopper *o*, to the top of the frame A, and has a curved hole, *g*, corresponding with a similar hole in the top of the frame A, but only one-half as long. Consequently, the valve can be moved from right to left, without decreasing the size of the hole shown in fig. 2 by dotted lines, which is for the purpose of throwing the seed to the right or left, at the will of the operator.

The slide *n* passes under the valve *s*, and out under the hopper *o*, to the end of the frame A, and is provided with a slot, *i*, to keep it in line with the hole *g'*, which the operator can change at will, either to open or close the hole *g*, or set it to any desired size, for small or large seed.

The operation is as follows:

The seed to be sown is put into the hopper *o*, or a sack attached in any convenient way to the hopper. The operator then takes hold of the crank, and puts the machine in motion; then draws out the slide *n* the proper distance, according to size of seed, which lets the seed fall into the distributer P, which, by centrifugal force, is thrown out and scattered evenly over the ground.

Having thus described my invention,

What I claim as new, and desire to secure by Letters Patent, is—

A seed-sower, having distributer P, pulley *m*, wheel B, valve *s*, slide *n*, shaft R, and hopper *o*, constructed and arranged to operate substantially as specified.

THOS. J. PRICE.

Witnesses:
JOHN M. PRICE,
ARCHD. FISHER.